(12) United States Patent
Kook et al.

(10) Patent No.: US 9,246,966 B2
(45) Date of Patent: Jan. 26, 2016

(54) METHOD AND APPARATUS FOR RECEIVING MULTIMEDIA CONTENTS

(71) Applicant: Samsung Electronics Co., Ltd., Gyeonggi-do (KR)

(72) Inventors: Seung-Ryong Kook, Gyeonggi-do (KR); Kyung-Jin Ahn, Gyeonggi-do (KR); Gil-Yoon Kim, Gyeonggi-do (KR); Nam-Guk Kim, Seoul (KR); Su-Hyung Kim, Seoul (KR); Jae-Yong Yang, Gyeonggi-do (KR); Heung-Ki Lee, Gyeonggi-do (KR); Hae-Taek Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 210 days.

(21) Appl. No.: 13/773,087

(22) Filed: Feb. 21, 2013

(65) Prior Publication Data
US 2013/0254345 A1    Sep. 26, 2013

(30) Foreign Application Priority Data
Mar. 21, 2012   (KR) .......................... 10-2012-0028628

(51) Int. Cl.
*G06F 15/173* (2006.01)
*H04L 29/06* (2006.01)
*H04N 21/238* (2011.01)
*H04N 21/24* (2011.01)
*H04N 21/414* (2011.01)
*H04N 21/472* (2011.01)
*H04N 21/442* (2011.01)

(52) U.S. Cl.
CPC .......... *H04L 65/60* (2013.01); *H04N 21/23805* (2013.01); *H04N 21/2402* (2013.01); *H04N 21/41407* (2013.01); *H04N 21/44209* (2013.01); *H04N 21/47202* (2013.01)

(58) Field of Classification Search
USPC .......................................... 709/224, 231, 238
See application file for complete search history.

(56) References Cited

U.S. PATENT DOCUMENTS

| | | |
|---|---|---|
| 6,449,658 B1 | 9/2002 | Lafe et al. |
| 7,003,580 B1 | 2/2006 | Cook |
| 7,228,317 B1 | 6/2007 | Epstein et al. |
| 7,650,421 B2 | 1/2010 | Patrick et al. |
| 7,886,073 B2 | 2/2011 | Gahm et al. |

(Continued)

FOREIGN PATENT DOCUMENTS

| | | |
|---|---|---|
| CN | 101321192 | 12/2008 |
| CN | 101453295 | 6/2009 |

(Continued)

OTHER PUBLICATIONS

Japanese Office Action dated Nov. 18, 2014 issued in counterpart application No. 2012-287412.

(Continued)

*Primary Examiner* — Kyung H Shin
(74) *Attorney, Agent, or Firm* — The Farrell Law Firm, P.C.

(57) ABSTRACT

Methods and apparatus are provided for transmitting and receiving multimedia contents. A transmission characteristic relating to a section, from among a plurality of sections for transmitting data, where an initial transmission speed is high, is provided from a server. The multimedia contents are requested in consideration of the transmission characteristic. The multimedia contents are received from the server.

16 Claims, 8 Drawing Sheets

(56) References Cited

U.S. PATENT DOCUMENTS

| | | | |
|---|---|---|---|
| 8,205,004 B1 * | 6/2012 | Kaufman et al. | 709/231 |
| 2002/0073205 A1 | 6/2002 | Mostafa | |
| 2002/0083133 A1 | 6/2002 | Feigenbaum | |
| 2002/0095509 A1 | 7/2002 | Fan | |
| 2004/0196849 A1 | 10/2004 | Aksu et al. | |
| 2004/0230678 A1 | 11/2004 | Huslak et al. | |
| 2005/0021739 A1 | 1/2005 | Carter et al. | |
| 2005/0050552 A1 | 3/2005 | Fuller | |
| 2005/0080911 A1 | 4/2005 | Stiers et al. | |
| 2007/0168348 A1 | 7/2007 | Forsyth | |
| 2007/0203886 A1 | 8/2007 | Epstein et al. | |
| 2008/0133771 A1 * | 6/2008 | Vardi et al. | 709/238 |
| 2009/0106451 A1 | 4/2009 | Zuckerman et al. | |
| 2009/0144400 A1 | 6/2009 | Kunito | |
| 2009/0300203 A1 | 12/2009 | Virdi et al. | |
| 2010/0281114 A1 | 11/2010 | Popek et al. | |
| 2010/0306373 A1 * | 12/2010 | Wormley | 709/224 |
| 2011/0055312 A1 | 3/2011 | Purdy, Sr. | |
| 2011/0145810 A1 | 6/2011 | Forsyth | |
| 2011/0219114 A1 | 9/2011 | Yang et al. | |
| 2011/0225302 A1 | 9/2011 | Park et al. | |
| 2011/0246761 A1 | 10/2011 | Alexandrov | |
| 2011/0265130 A1 | 10/2011 | Shang | |
| 2011/0296485 A1 | 12/2011 | Nilsson et al. | |
| 2011/0299588 A1 | 12/2011 | Zhou et al. | |

FOREIGN PATENT DOCUMENTS

| | | |
|---|---|---|
| CN | 101640895 | 2/2010 |
| EP | 1480457 | 11/2004 |
| JP | 2000-228669 | 8/2000 |
| JP | 2002-281103 | 9/2002 |
| JP | 2003-288290 | 10/2003 |
| JP | 2004-505384 | 2/2004 |
| JP | 2006-525693 | 11/2006 |
| JP | 2008-085860 | 4/2008 |
| KR | 1020090043833 | 5/2009 |
| KR | 1020100086178 | 7/2010 |
| KR | 10-1064002 | 9/2011 |

OTHER PUBLICATIONS

European Search Report dated Apr. 20, 2015 issued in counterpart application No. 13158243.9-1905.

Chinese Office Action dated Sep. 28, 2015 issued in counterpart application No. 201310092770.9, 16 pages.

* cited by examiner

METHOD AND APPARATUS FOR RECEIVING MULTIMEDIA CONTENTS

PRIORITY

This application claims priority under 35 U.S.C. §119(a) to a Korean patent application filed in the Korean Intellectual Property Office on Mar. 21, 2012 and assigned Serial No. 10-2012-0028628, the entire disclosure of which is incorporated herein by reference.

BACKGROUND OF THE INVENTION

1. Field of the Invention

The present invention relates generally to an electronic device and a method thereof, and more particularly, to a method and an electronic device for accelerating multimedia streaming.

2. Description of the Related Art

Multimedia streaming services are provided by many websites. The distribution of personal portable terminals allows people to easily use multimedia contents via the multimedia streaming services, even in outdoor spaces. The demand for multimedia content having high image quality and high capacity is increasing.

Methods for transmitting media data via a network are classified into a download method and a streaming method. In the streaming method, a server transmits media data in real-time, and a client reproduces received media data in real-time. Specifically, the streaming method relates to technology for giving and taking multimedia content including audio/video, while not downloading the content. The streaming technology does not download and process information at one time, but instead continuously receives information sufficient for processing on a packet basis. Accordingly, a user does not need to download all of the multimedia content at one time.

Unlike the download method of starting reproduction of media data after the transmitting/receiving of the media data, the streaming method transmits/receives media data in real-time via a communication channel set between a server and a client, thereby reproducing the multimedia data. Particularly, since a greater amount of data than general content should be transmitted in real-time for reproduction of high image quality contents, a buffering phenomenon may frequently occur during streaming reproduction. For this reason, a method and an apparatus for increasing a streaming speed to allow a user to view multimedia contents without disconnection are desired.

SUMMARY OF THE INVENTION

The present invention has been made to address at least the above problems and/or disadvantages and to provide at least the advantages described below. Accordingly, an aspect of the present invention provides a method and an apparatus for receiving multimedia contents using a transmission characteristic of a server that sends data fast initially.

Another aspect of the present invention provides an apparatus and a method for reproducing multimedia contents without buffering by improving a multimedia streaming performance.

An additional aspect of the present invention provides an apparatus and a method for improving a streaming power consumption efficiency by reducing a connection time for streaming transmission.

In accordance with an aspect of the present invention, a method is provided for receiving multimedia contents. The multimedia contents are requested in consideration of a transmission characteristic of a server relating to a section, among a plurality of sections for transmitting data, in which an initial transmission speed is high. The multimedia contents are received from the server.

In accordance with another aspect of the present invention, an electronic device is provided that includes a memory, one or more processors, and one or more modules stored in the memory and configured to be executable by the one or more processors. The one or more modules comprise instructions for requesting multimedia contents in consideration of a transmission characteristic of a server relating to a section, among a plurality of sections for transmitting data, in which an initial transmission speed is high, and receiving the multimedia contents from the server.

In accordance with further another aspect of the present invention, a method is provided for transmitting multimedia contents. A transmission characteristic is provided relating to a section, from among a plurality of sections for transmitting data, where an initial transmission speed is high, and a request to transmit the multimedia contents is received from a client. The multimedia contents are transmitted to the client.

In accordance with still another aspect of the present invention, a server apparatus is provided for transmitting multimedia contents. The apparatus includes a controller for providing a transmission characteristic relating to a section, from among a plurality of sections for transmitting data, where an initial transmission speed is high, receiving a request to transmit the multimedia contents from, and transmitting the multimedia contents to the client.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
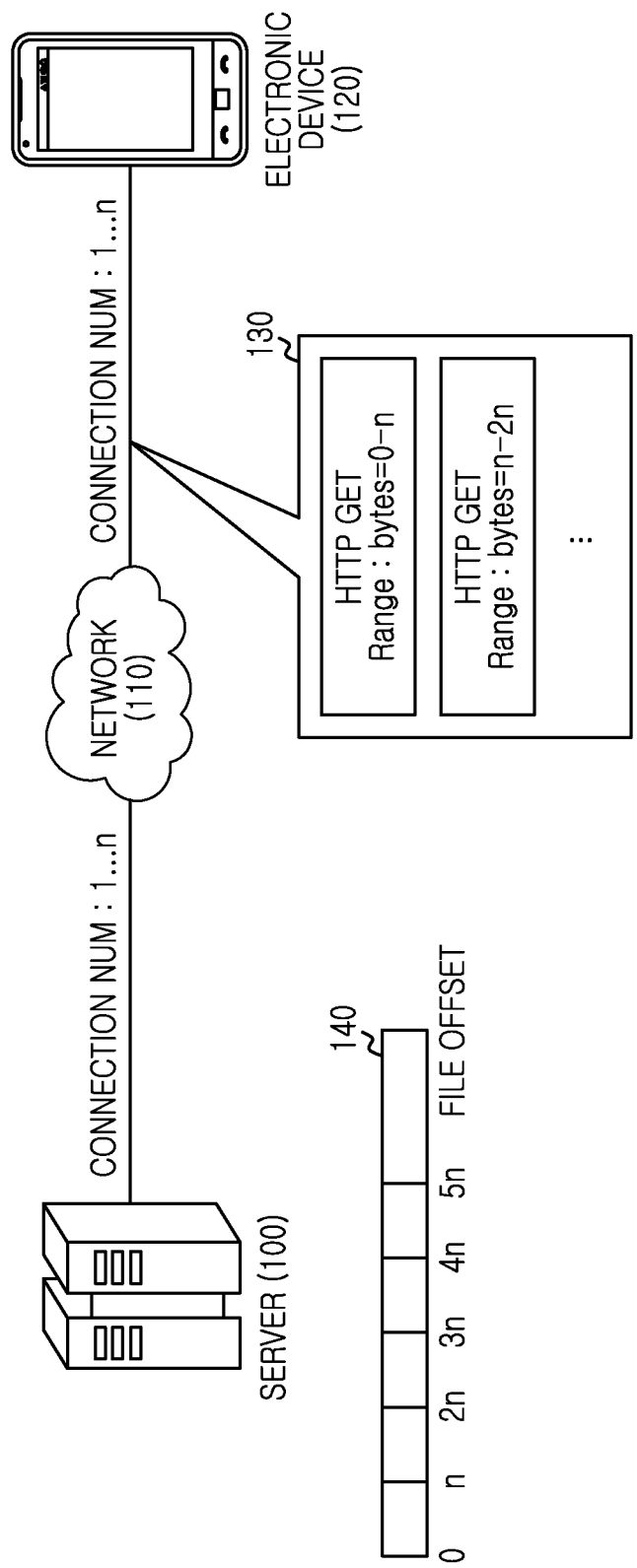
FIG. 1 is a diagram illustrating a multimedia streaming service system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide a method and an apparatus for receiving multimedia contents using a transmission characteristic of sending data fast initially. Specifically, embodiments of the present invention provide a method and an apparatus for determining a characteristic of a server when receiving multimedia contents from the streaming server to calculate an optimized threshold, and improving a download speed of a client, thereby accelerating streaming.

FIG. 1 is a diagram illustrating a multimedia streaming service system, according to an embodiment of the present invention.

Referring to FIG. 1, a server 100 provides a streaming service to a client 120 via a network 110. The client 120 supports an Internet protocol and a multimedia service function and may be embodied as an electronic device. The electronic device may be, for example, a portable electronic device, such as a portable terminal, a mobile phone, a mobile pad, a media player, a tablet computer, a handheld computer, and a Personal Digital Assistant (PDA).

The client 120 may request the server 100 to provide a streaming service via the network 110. For example, to reproduce multimedia contents stored in the server 100 in a streaming method, the client 120 receives a file 140 corresponding to multimedia contents in the form of a plurality of packets via a Hyper Text Transfer Protocol (HTTP) GET message 130. The client 120 requests the server 100 to transmit O–n byte-packets of the file corresponding to the contents via a first HTTP GET message. The client 120 requests the server 100 to transmit n–2n byte-packets of the file corresponding to the contents via a second HTTP GET message. The client 120 requests the server 100 to transmit packets via an HTTP GET message until the client 120 has completely received the file corresponding to the multimedia contents. In an embodiment of the present invention, the client 120 determines a request data section and the number of network socket connections, and a time point based on a transmission characteristic of the server 100, which is described in greater detail below with reference to FIGS. 3 to 6.

The server 100 provides a streaming service in response to a request of the client 120 and for this purpose, makes and stores various multimedia contents in the form of a database.

Figure 2:
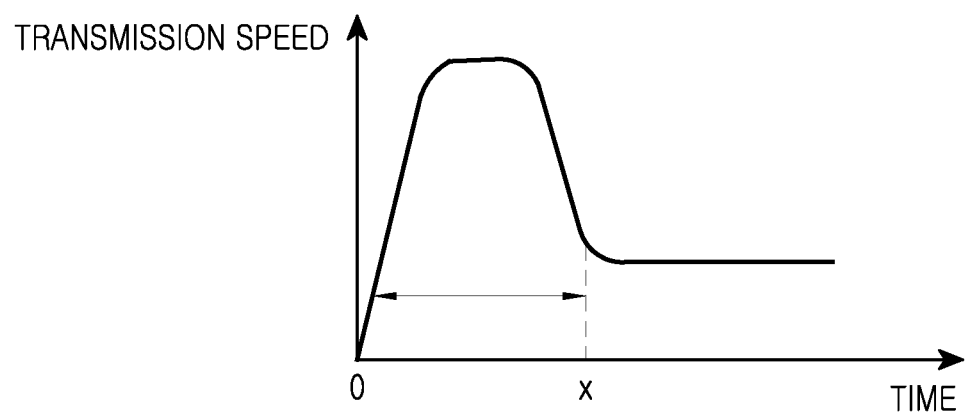
FIG. 2 is a graph illustrating a transmission characteristic of a server, according to an embodiment of the present invention.

FIG. 2 is a graph illustrating a transmission characteristic of a server, according to an embodiment of the present invention.

A network transmission pattern of a streaming server is expressed in FIG. 2. FIG. 2 illustrates a transmission pattern of most of streaming servers. Examination of a transmission characteristic of the streaming server shows that the server has a characteristic of sending media data fast when a client requests data initially in order to reduce initial buffering time of the client. For example, the server shows a characteristic of having a high transmission speed of multimedia contents for time of 0~x (200) and having a slow transmission speed thereafter.

Figure 3:
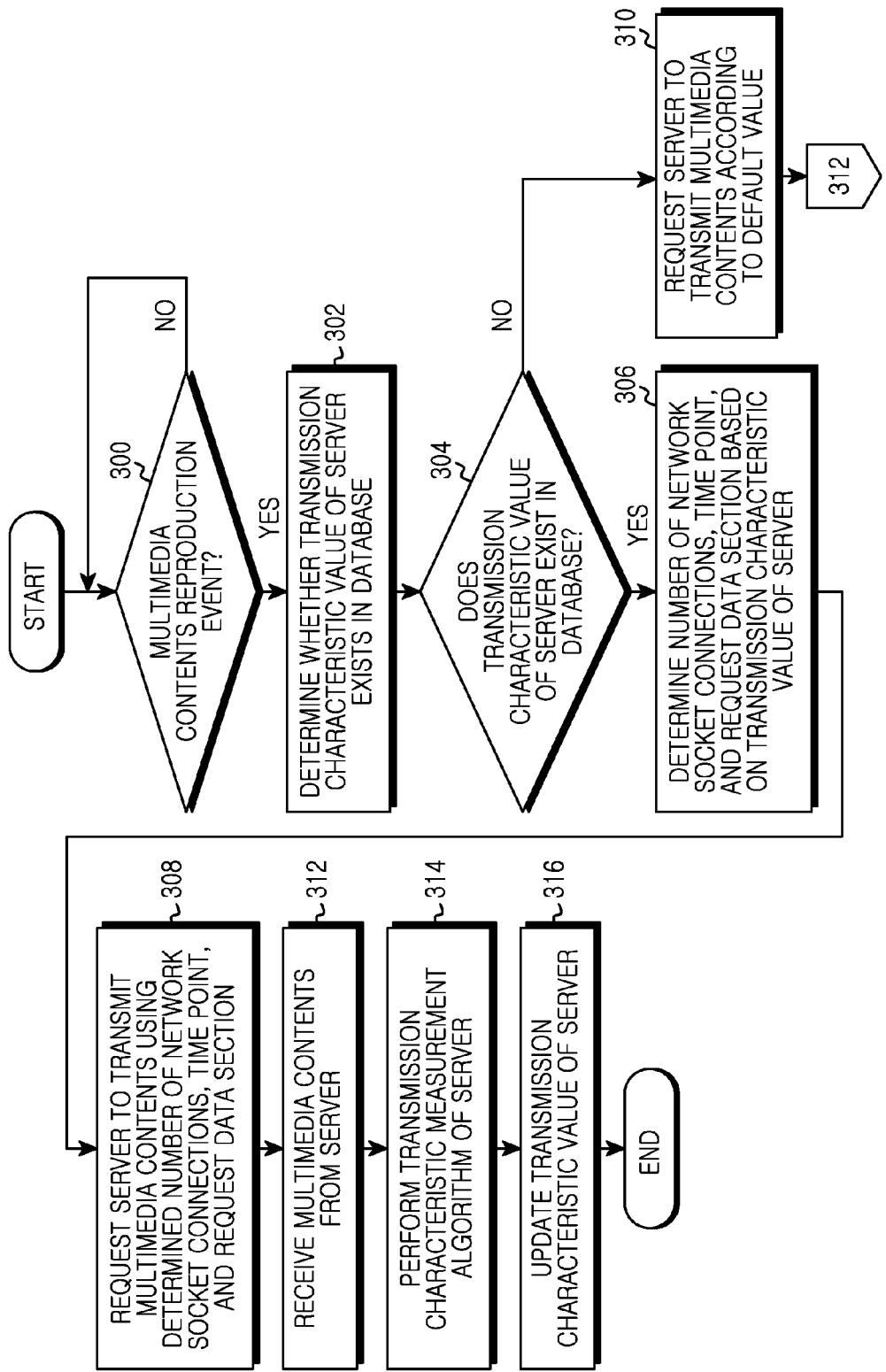
FIG. 3 is a flowchart illustrating a multimedia streaming service, according to an embodiment of the present invention.

FIG. 3 is a flowchart illustrating a multimedia streaming service, according to an embodiment of the present invention.

Referring to FIG. 3, it is determined whether a multimedia contents reproduction event occurs, in step 300. When a multimedia contents reproduction event occurs, a client determines whether a transmission characteristic value of a server exists in a database, in step 302. The transmission characteristic value of the server is a value stored and updated in an internal memory of the client. Depending on realization, the transmission characteristic value may be stored in a separate server and updated, and the client may request the relevant server to transmit the transmission characteristic value of a server or a list of transmission characteristic values of a plurality of servers.

In step 304, it is determined whether the transmission characteristic value of the server exists in the database. When the transmission characteristic value of the server exists in the database, the client proceeds to step 306, and when the transmission characteristic value of the server does not exist in the database, the client proceeds to step 310.

The client determines a request data section, the number of network socket connections, and a time point based on the transmission characteristic of the server, in step 306. For example, the client determines a section for initially sending a data packet fast as a request data section, and determines the number of network socket connections depending on a request data size. The client may use one or more network socket connections simultaneously to receive more data at the same time point. In addition, the network connection time point tries a new network connection before the request data section ends. For example, when a server transmits 1 MB of data corresponding to the request data section, the new network connection tries a new network connection at a time point at which the client receives about 800 KB. Also, when a buffering size of a streaming player is known, the number of new connections for filling the buffer by the buffering size at the beginning may be minimized. This may be minimized because when a new network connection is frequently added within a buffering section, a buffering time may be longer than the conventional art.

Meanwhile, though two or more network socket connections may be performed at the same time point generally depending on a request data size in determining the number of network connections, one network socket connection may be selected. For example, the server may not support more than one network streaming socket connection for the same client or one network connection may be optimal due to reasons such as a network environment of a client or a limited performance of a client, etc. When determining that one connection is optimal, a client may improve performance by repeating connection and disconnection for a request data section instead of improving performance by one or more simultaneous network streaming socket connections. This improved performance is because an effect of continuously connecting sections of sending data fast may be obtained by utilizing a characteristic that a server sends data fast at an initial socket connection stage. Specifically, when the client requests data as much as the determined request data section and then receives all the data, the client cuts off the network socket connection and performs a network socket connection again to request data as much as the previously requested data section. When repeating this process, the client may continuously obtain the effect of receiving data fast from the server.

The client requests the server to transmit multimedia contents with consideration of the determined request data size, the number of network connections, and a time point, in step 308.

When the transmission characteristic value of the server does not exist in a database, the client requests the server to transmit multimedia contents according to a default value, in step 310. The default value may be determined using a statistical value for the server transmission characteristic.

The client receives multimedia contents in the form of a plurality of packets from the server, in step 312.

While receiving the multimedia contents in the form of a plurality of packets from the server, the client performs a transmission characteristic measurement algorithm of the server to measure a transmission characteristic value, in step 314.

The client updates a transmission characteristic value stored in the previous database using the measured transmission characteristic value, in step 316.

In an embodiment of the present invention, a client always performs the transmission characteristic measurement algorithm of the server regardless of the existence of a transmission characteristic value in the database to measure and update the transmission characteristic value. In another embodiment of the present invention, a client performs the transmission characteristic measurement algorithm of the server only when the transmission characteristic value does not exist in the database to measure and update the transmission characteristic value. In a further embodiment of the present invention, a client may perform the transmission characteristic measurement algorithm of the server when the transmission characteristic value does not exist in the database to measure the transmission characteristic value, cut off a current connection after the measurement, and request a new connection using the measured transmission characteristic value.

Figure 4:
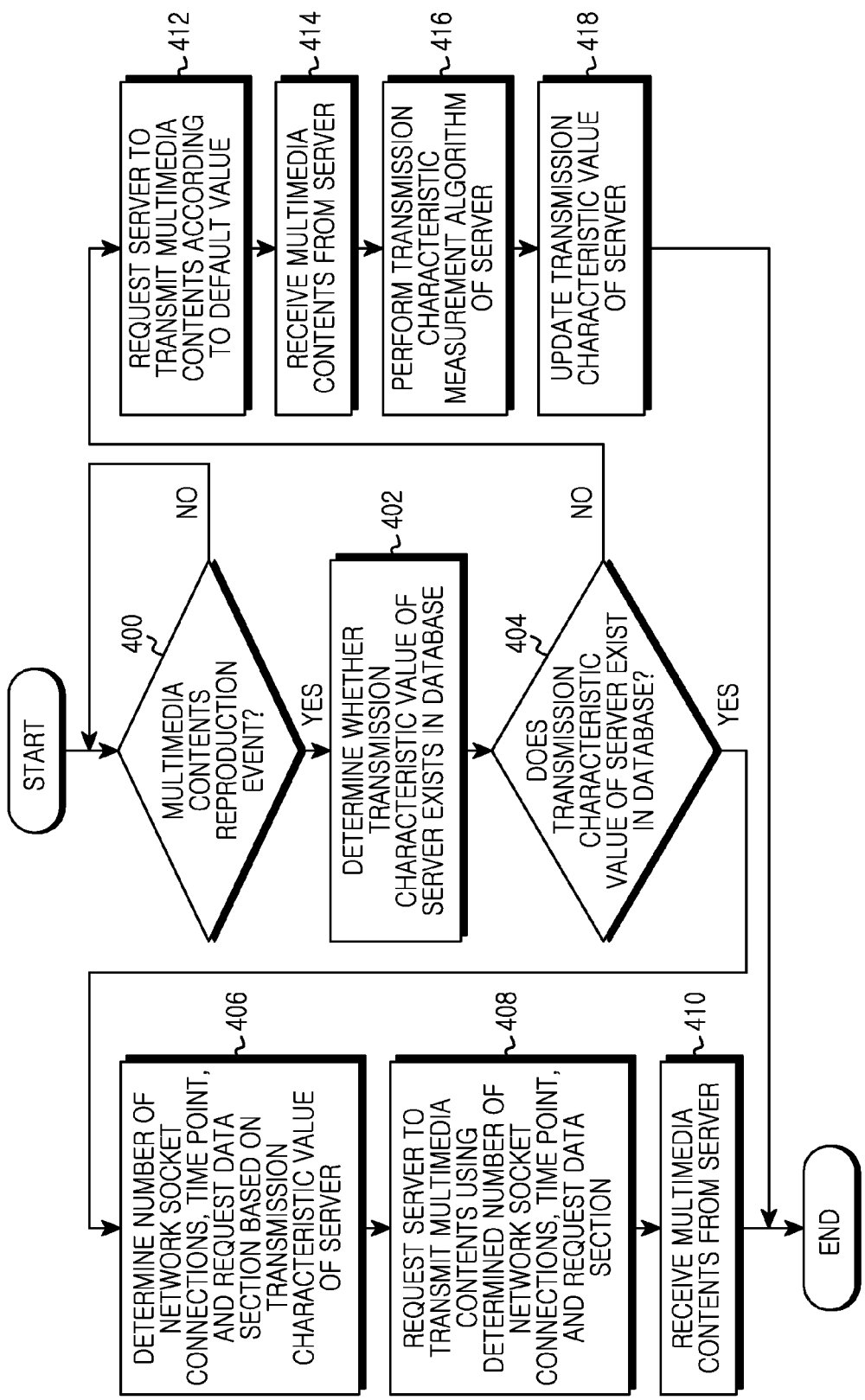
FIG. 4 is a flowchart illustrating a multimedia streaming service, according to another embodiment of the present invention.

FIG. 4 is a flowchart illustrating a multimedia streaming service, according to another embodiment of the present invention.

Referring to FIG. 4, it is determined whether a multimedia contents reproduction event occurs, in step 400. When a multimedia contents reproduction event occurs, a client determines whether a transmission characteristic value of a server exists in a database, in step 402. The transmission characteristic value of the server is a value stored in an internal memory of the client and updated. Depending on realization, the transmission characteristic value may be stored in a separate server and updated. The client may request the relevant server to transmit the transmission characteristic value of a server or a list of transmission characteristic values of a plurality of servers.

It is determined whether the transmission characteristic value of the server exists in the database in step 404. When the transmission characteristic value of the server exists in the database, the client proceeds to step 406. When the transmission characteristic value of the server does not exist in the database, the client proceeds to step 412.

The client determines a request data section, the number of network socket connections, and a time point based on the transmission characteristic value of the server, in step 406. For example, the client determines a section for initially sending a data packet fast as the request data section, and determines the number of network socket connections depending on a request data size. The client may use one or more network socket connections simultaneously to receive more data at the same time point. In addition, the network connection time point tries a new network connection before the request data section ends.

Meanwhile, though two or more network socket connections may be performed at the same time point, generally depending on a request data size in determining the number of network connections, one network socket connection may be selected. For example, the server may not support more than one network streaming socket connection for the same client or one network connection may be optimal due to reasons such as a network environment of a client or a limited performance of a client, etc. When determining that one connection is optimal, a client may improve performance by repeating connection and disconnection for a request data section instead of improving performance by one or more simultaneous network streaming socket connections. This is because an effect of continuously connecting sections of sending data fast may be obtained by utilizing a characteristic that a server sends data fast at an initial socket connection stage. Specifically, when the client requests data as much as the determined request data section and then receives all the data, the client cuts off the network socket connection and performs a network socket connection again to request data as much as the previously requested data section. When repeating this process, the client may continuously obtain the effect of receiving data fast from the server.

The client requests the server to transmit multimedia contents in consideration of the determined request data size, the number of network connections, and a time point, in step 408, and receives the multimedia contents in the form of a plurality of packets from the server, in step 410.

When the transmission characteristic value of the server does not exist in a database, the client requests the server to transmit multimedia contents according to a default value, in step 412. The default value may be determined using a statistical value for the server transmission characteristic.

The client receives multimedia contents in the form of a plurality of packets from the server, in step 414.

While receiving the multimedia contents in the form of a plurality of packets from the server, the client performs a transmission characteristic measurement algorithm of the server to measure a transmission characteristic value, in step 416.

The client stores the measured transmission characteristic value in the database, in step 418.

Figure 5:
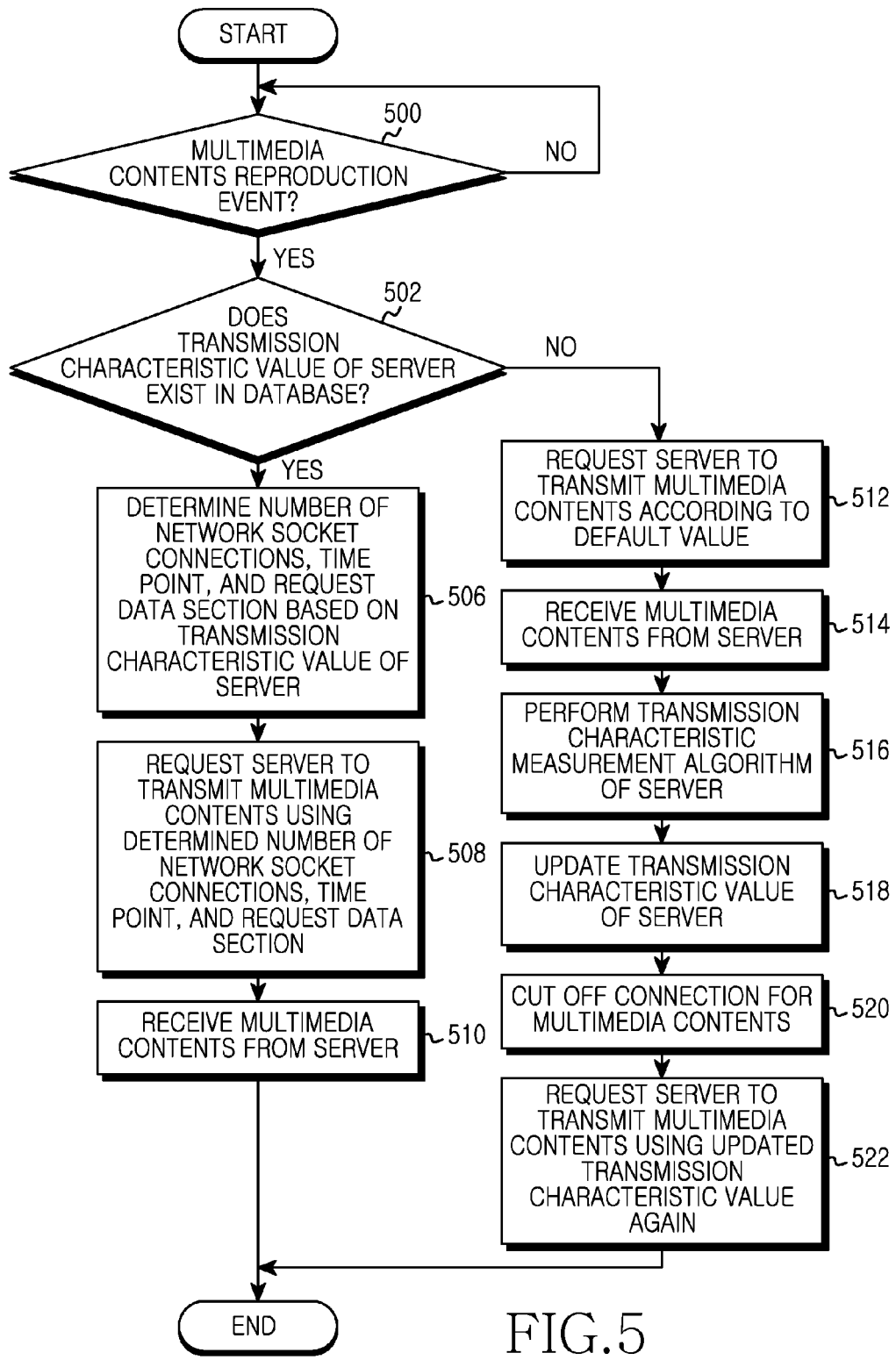
FIG. 5 is a flowchart illustrating a multimedia streaming service, according to a further embodiment of the present invention.

FIG. 5 is a flowchart illustrating a multimedia streaming service, according to a further embodiment of the present invention.

Referring to FIG. 5, it is determined whether a multimedia contents reproduction event occurs, in step 500. When a multimedia contents reproduction event occurs, a client determines whether a transmission characteristic value of a server exists in a database, in step 502. The transmission characteristic value of the server is a value stored in an internal memory of the client and updated. Depending on realization, the transmission characteristic value may be stored and updated in a separate server, and at this point, the client may request the relevant server to transmit the transmission characteristic value of a server or a list of transmission characteristic values of a plurality of servers.

When the transmission characteristic value of the server exists in the database, the client proceeds to step 506, and when the transmission characteristic value of the server does not exist in the database, the client proceeds to step 512.

The client determines a request data section, the number of network socket connections, and a time point based on the transmission characteristic of the server, in step 506. For example, the client determines a section for initially sending a data packet fast as a request data section, and determines the number of network socket connections depending on a request data size. The client may use one or more network socket connections simultaneously to receive more data at the same time point. In addition, the network connection time point tries a new network connection before a request data section ends.

Though two or more network socket connections may be performed at the same time point, generally depending on the request data size in determining the number of network connections, one network socket connection may be selected. For example, the server may not support more than one network streaming socket connection for the same client or one network connection may be optimal due to reasons such as a network environment of a client or a limited performance of a client, etc. When determining that one connection is optimal, a client may improve performance by repeating connection and disconnection for the request data section instead of improving performance by one or more simultaneous network streaming socket connections. This is because an effect of continuously connecting sections of sending data fast may be obtained by utilizing a characteristic that a server sends data fast at an initial socket connection stage. Specifically, when the client requests data as much as the determined request data section and then receives all the data, the client cuts off the network socket connection and performs a network socket connection again to request data as much as the previously requested data section. When repeating this process, the client may continuously obtain the effect of receiving data fast from the server.

The client requests the server to transmit multimedia contents in consideration of the determined request data size, the number of network connections, and the time point, in step 508, and receives the multimedia contents in the form of a plurality of packets from the server, in step 510.

When the transmission characteristic value of the server does not exist in a database, the client requests the server to transmit multimedia contents according to a default value, in step 512. The default value may be determined using a statistical value for the server transmission characteristic.

The client receives multimedia contents in the form of a plurality of packets from the server, in step 512.

While receiving the multimedia contents in the form of a plurality of packets from the server, the client performs a transmission characteristic measurement algorithm of the server to measure a transmission characteristic value, in step 516.

The client stores the measured transmission characteristic value in the database, in step 518.

The client cuts off a current connection for the multimedia contents, in step 520, and requests the server to transmit the multimedia contents again using the measured transmission characteristic value, in step 522.

Figure 6:
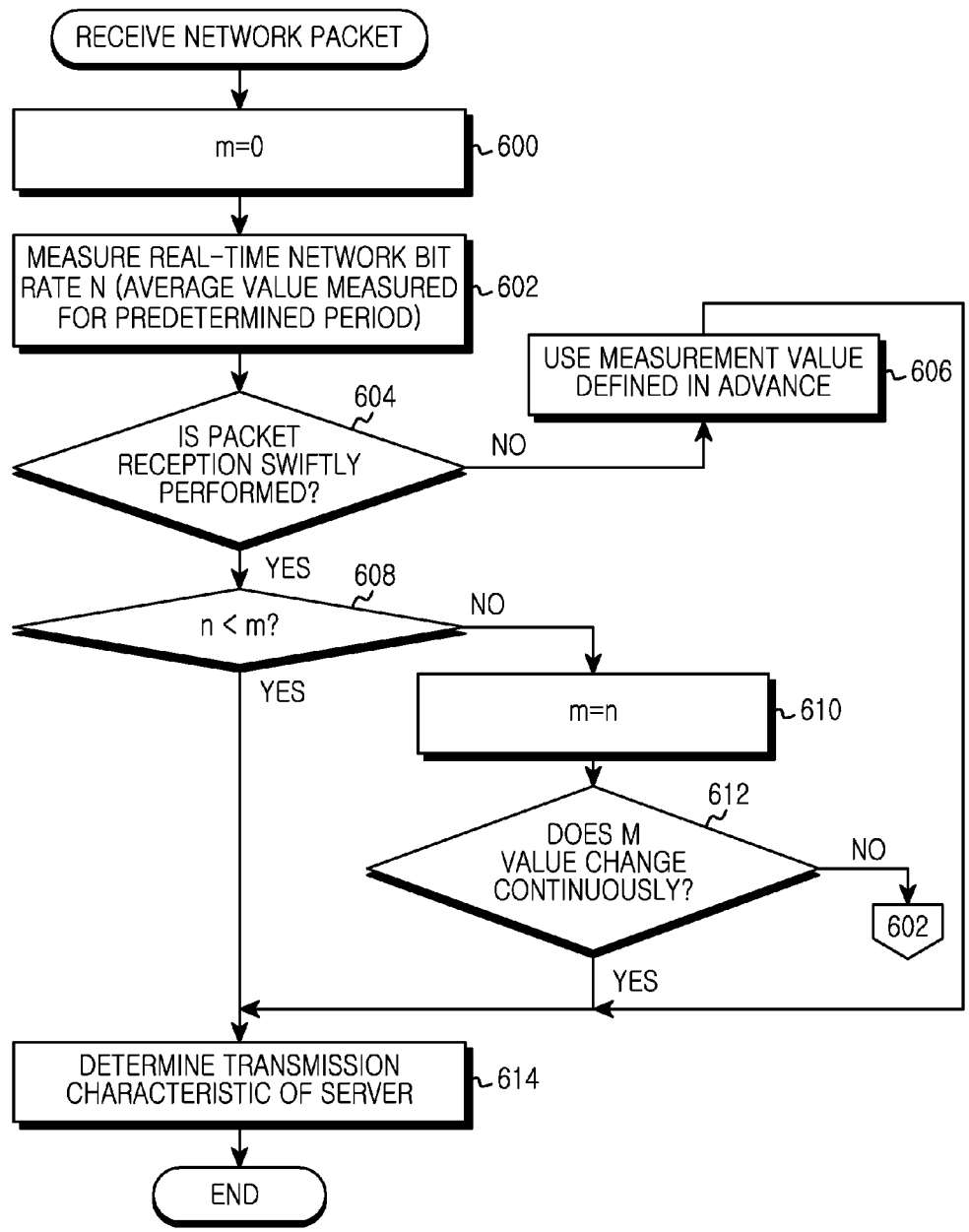
FIG. 6 is a flowchart illustrating a method for measuring a transmission characteristic, according to an embodiment of the present invention.

FIG. 6 is a flowchart illustrating a method for measuring a transmission characteristic, according to an embodiment of the present invention.

Referring to FIG. 6, a client sets m=0, in step 600, where m is a parameter for updating a transmission characteristic value.

The client measures a real-time bit rate n of a packet received from a server in response to an HTTP GET request, in step 602. The bit rate n is an average value measured during a predetermined interval (for example, an interval of 100 ms-1 s). The embodiments of the present invention are not limited to this bit rate measurement and other bit rate measurement methods may be applied.

In step 604, it is determined whether packet reception is swiftly performed. When packet reception is not swift, the client proceeds to step 606 to use a measurement value defined in advance. Whether packet reception is swift is determined because reliability of a measurement value falls down in the case where reception of a network packet is not constant or in case of a serious weak electric field (that is, poor channel state environment). Also, measurement may not be possible because of other various reasons. The measurement value defined in advance may be used. The measurement value defined in advance is derived from numerous experimental data. Also, for the measurement value defined in advance, various values may be defined depending on various moving picture characteristics or service characteristics.

When packet reception is swift in step 604, the client proceeds to step 608 to determine whether m>n. Specifically, the client determines whether a previous bit rate m is greater than a currently measured bit rate n.

When the previous bit rate m is greater than the currently measured bit rate n, the client proceeds to step 614.

In contrast, when the previous bit rate m is less than or equal to the currently measured bit rate n, the client proceeds to step 610 to set the previous bit rate to the currently measured bit rate n.

The client proceeds to step 612 to determine whether a value m changes continuously. When the value m changes continuously, the client proceeds to step 602. When the value m does not change continuously, the client proceeds to step 614. Continuous change of the value m denotes that a section during which a server transmits data initially continues, as in FIG. 2. Non-continuous change of the value m denotes that a slow bit rate is maintained after the section during which the server transmits data initially, as in FIG. 2.

When the measurement value m continuously changes, the client continuously measures a network bit rate in real-time. When the measurement value m does not continuously change, the client determines that the server maintains the slow bit rate appearing after the section where the server transmits data fast initially.

The client determines a data size transmitted fast by the server depending on a case of using a measurement value defined in advance, in step 606, a case where the measurement value becomes smaller than the previous value, in step 608, or a case where the measurement value does not continuously change, in step 614. For example, the client measures a data size transmitted from the streaming server during the time section from 0 to x of FIG. 2.

After the transmission characteristic measurement of the server is completed, the client determines the number of network socket connections, a time point, and a request data section. This is for receiving more data at the same time point by performing network socket connections simultaneously. The request data section is for requesting an appropriate data section to show a maximum streaming performance.

However, though two or more network socket connections may be performed at the same time point, generally in determining the number of network connections, one network socket connection may be selected. For example, the server may not support more than one network streaming socket connection for the same client or one network connection may be optimal due to reasons such as a network environment of a client or a limited performance of a client, etc. When determining that one network socket connection is optimal, a client may improve performance by repeating connection and disconnection for a request data section in the one network socket connection, instead of improving performance by one or more simultaneous network streaming socket connections. This is because an effect of continuously connecting sections of sending data fast may be obtained by utilizing a characteristic that a server sends data fast at an initial socket connection stage. Specifically, when the client requests data as much as the determined request data section and then receives all the data, the client cuts off the network socket connection and performs a network socket connection again to request data as much as the previously requested data section. When repeating this process, the client may continuously obtain the effect of receiving data fast from the server.

When determining the request data section using a transmission characteristic measurement value of the server, the client may determine the measured value as a request data size. However, in a network streaming, a packet may be retransmitted due to a weak electric field or a network characteristic. At this point, an amount of repeated data retransmitted may be reduced for raising an efficiency at the maximum. Therefore, the request data section may be determined on an I frame basis or Group Of Picture (GOP) basis during retransmission. Alternatively, the client may determine a request data section on an I frame or GOP basis regardless of retransmission.

Figure 7:
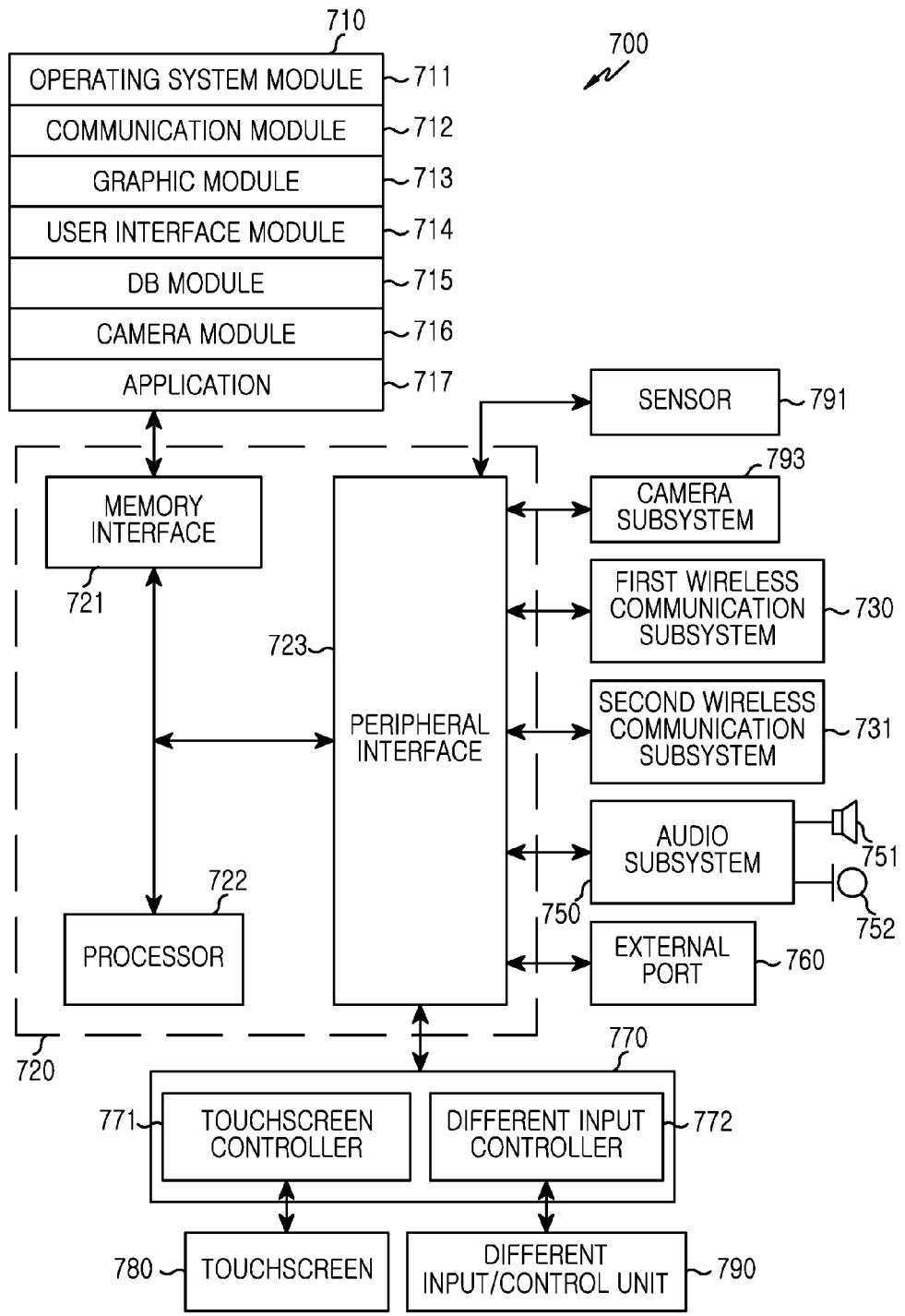
FIG. 7 is a block diagram illustrating an electronic device, according to an embodiment of the present invention.

FIG. 7 is a block diagram illustrating an electronic device, according to an embodiment of the present invention. The electronic device 700 may be embodied as a portable electronic device, such as a portable terminal, a mobile phone, a mobile pad, a media player, a tablet computer, a handheld computer, and a PDA. Also, the electronic device may be an arbitrary portable electronic device including a device combining two or more functions among these devices.

Referring to FIG. 7, the electronic device 700 includes a memory 710, a processor unit 720, a first wireless communication subsystem 730, a second wireless communication subsystem 731, an external port 760, an audio subsystem 750, a speaker 751, a microphone 752, an Input/Output (I/O) subsystem 770, a touchscreen 780, and a different input/control unit 790. A plurality of memories 710 and external ports 760 may be used.

The processor unit 720 includes a memory interface 721, one or more processors 722, and a peripheral interface 723. Depending on cases, the entire processor unit 720 may be referred to as a processor. The memory interface 721, one or more processors 722 and/or the peripheral interface 723 may be separate elements or may be integrated in one or more integrated circuits.

The processor 722 executes various software programs to perform various functions for the electronic device 700, and performs processes and controls for voice communication and data communication. Also, in addition to the general functions, the processor 722 executes a specific software module (instruction set) stored in the memory 710 to perform various specific functions corresponding to the module. Specifically, the processor 722 performs a method, according to an embodiment of the present invention, in cooperation with software modules stored in the memory 710.

According to an embodiment of the present invention, the processor 722 measures a data size and time where a server transmits data fast. By doing so, the processor 722 may determine different characteristics of various streaming servers. The processor 722 uses a predetermined value for the case where it is difficult to measure a data size and time in real-time during multimedia streaming.

The processor 722 determines a network socket connection time point threshold that can maximize a streaming performance based on a transmission characteristic value of the server. For example, when a new network socket connection point is too late in the client, a download speed performance may be deteriorated during a multimedia streaming. In contrast, when a new network socket connection point is too fast, frequent socket generation or extinction and frequent network connection path generation or extinction are repeated, so that a load more than necessary may be given to the server or the client. Also, the number of network socket connections is determined based on the transmission characteristic value of the server.

The processor 722 determines an amount of data to receive continuously in one network socket connection to determine a request data section. The request data section should be less than or equal to a data section for which the server is requested by the client. When the data section is too short or too long, a multimedia streaming download performance may deteriorate.

A method according to an embodiment of the present invention is descried above with respect to FIGS. 3 to 6.

The processor 722 may include one or more data processors, image processors, or a multimedia contents streaming accelerator. The data processor, the image processor, and the multimedia contents streaming accelerator may be configured separately. Also, the processor 722 may be configured using a plurality of processors performing different functions. The peripheral interface 723 connects the I/O subsystem 770 of the electronic device 700 and various peripheral devices to the processor 722 and the memory 710 (via the memory interface).

Various elements of the electronic device 700 may be coupled via one or more communication buses or stream lines.

The external port 760 is used for directly connecting the electronic device 700 to other electronic devices or indirectly connecting the electronic device 700 to other electronic devices via a network (for example, the Internet, an Intranet, a wireless LAN, etc.) The external port 760 may be a Universal Serial Bus (USB) or a FIREWIRE port, but is not limited thereto.

A sensor 791 may be coupled to the peripheral interface 723 to enable various functions. For example, a movement sensor and a light sensor may be coupled to the peripheral interface 723 to enable movement detection of the electronic device and light detection from the outside. Besides, other sensors such as a position measurement system, a temperature sensor, or a living body sensor may be coupled to the peripheral interface 723 to perform relevant functions.

The camera subsystem 793 may be coupled to the sensor 791 to perform a camera function such as photography or video clip recording.

The electronic device performs a communication function via one or more of the first and second wireless communication subsystems 730 and 731. The wireless communication subsystems 730 and 731 may include a Radio Frequency (RF) receiver and a transceiver and/or light (for example, an infrared) receiver and transceiver. The first communication subsystem 730 and the second communication subsystem 731 may be discriminated depending on a communication network via which the electronic device 700 communicates. For example, the communication network may include a communication subsystem designed for operating via a Global System for Mobile Communication (GSM) network, an Enhanced Data GSM Environment network, a Code Division Multiple Access (CDMA) network, a Wide-CDMA (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network, etc. but is not limited thereto. The first wireless communication subsystem 730 and the second wireless communication system 731 may be merged to form one wireless communication subsystem.

The audio subsystem 750 may be coupled to the speaker 751 and the microphone 752 to take charge of voice recognition, voice duplication, digital recording, and input/output of an audio stream, such as a telephone function. Specifically, the audio subsystem 750 communicates with a user via the speaker 751 and the microphone 752. The audio subsystem 750 receives a data stream via the peripheral interface 723 of the processor unit 720, and converts the received data stream to an electric stream. The converted electric stream (electric signal) is transferred to the speaker 751. The speaker 751 converts the electric stream to a sound wave audible by a human being and outputs the same. The microphone 752 converts a sound wave transferred from a human being or other sound sources to an electric stream. The audio subsystem 750 receives the electric stream converted by the microphone 752. The audio subsystem 750 converts the received electric stream to an audio data stream, and transmits the converted audio data stream to the peripheral interface 723. The audio subsystem 750 may include an attachable and detachable ear phone, a head phone, or a headset.

The I/O subsystem 770 includes a touchscreen controller 771 and/or a different input controller 772. The touchscreen controller 771 may be coupled to the touchscreen 780. The touchscreen 780 and the touchscreen controller 771 may detect a contact and movement or stoppage of these using an arbitrary multi-touch detection technology including other proximity sensor arrangements or other elements as well as capacitive, resistive, infrared, and surface acoustic wave technologies for determining one or more contact points with the touchscreen 780, though it is not limited thereto. The different input controller 772 may be coupled to the different input/control unit 790. The different input/control unit 790 may include one or more up/down buttons for controlling a volume of the speaker and the microphone 752. Also, the button may be a push button or a rocker button, a rocker switch, a thumbwheel, a dial, a stick, and/or a pointer device such as a stylus, etc.

The touchscreen 780 provides an input/output interface between the electronic device 700 and a user. Specifically, the touchscreen 780 transfers the user's touch input to the electronic device 700. Also, the touchscreen 780 serves as a medium for showing an output of the electronic device 700 to the user. That is, the touchscreen 780 shows a visual output to the user. This visual output appears in the form of text, graphics, video, and a combination of these.

Various displays may be used as the touchscreen 780. For example, the touchscreen 780 may be a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED) or a Flexible LED (FLED).

The memory 710 may be coupled to the memory interface 721. The memory 710 may include a high-speed random access memory such as one or more magnetic disc storage devices and/or a non-volatile memory, one or more optical storage devices and/or a flash memory (for example, NAND, NOR).

The memory 710 stores software. Software elements include an operating system module 711, a communication module 712, a graphic module 713, a user interface module 714, a DB module 715, a camera module 716, one or more application modules 717, etc. Also, since a module, which is a software element, can be expressed in terms of a set of instructions, the module is also expressed as an instruction set. The module is also expressed as a program.

The operating system software 711 (for example, built-in operating system such as WINDOWS, LINUX, Darwin, RTXC, UNIX, OS X, or VxWorks) includes various software elements for controlling a general system operation. For example, this control of the general system operation denotes memory management and control, storage hardware (device) control and management, power control and management, etc. This operating system software performs a function for smoothing communication between various hardwares (devices) and software elements (modules).

The communication module 712 may enable communication with other electronic devices such as a computer, a server and/or a portable terminal, via the wireless communication subsystems 730, 731 or the external port 760.

The graphic module 713 includes various software elements for providing and displaying graphics on the touchscreen 780. A terminology of graphics denotes text, a web page, an icon, a digital image, a video, animation, etc.

The user interface module 714 includes various software elements related to a user interface. The user interface module 714 includes content as to how the state of the user interface is changed or under what condition a change of a user interface state is performed, etc.

The DB module 715 stores a measured transmission characteristic value of the server and a transmission characteristic value of a default server as a database.

The camera module 716 includes a camera-related software element for enabling camera-related processes and functions. The application module 717 includes a browser, an electronic mail, an instant message, word processing, keyboard emulation, an address book, a touch list, a widget, Digital Right Management (DRM), voice recognition, voice duplication, position determining function, location based service, etc. The memory 710 may include an additional module (instructions) besides the above-described modules. Alternatively, the memory 710 may not use some of the modules (instructions) when needed.

The application module 717 for performing a multimedia contents streaming service may include software elements related to a multimedia streaming process. The application module 717 includes an instruction set corresponding to an embodiment of the present invention. When a multimedia contents reproduction event occurs, an instruction according to an embodiment of the present invention determines whether a transmission characteristic value of a server exists in a database. When the transmission characteristic value of the server exists in the database, a request data section, the number of network socket connections, and a time point are determined based on the transmission characteristic value of the server. The server is requested to transmit multimedia contents in consideration of the determined request data size, the number of network connections, and the time point. The multimedia contents are received in the form of a plurality of packets from the server. In addition, when the transmission characteristic value of the server does not exist in the database, the client requests the server to transmit the multimedia contents according to a default value, and receives the multimedia contents in the form of a plurality of packets from the server. Also, while receiving the multimedia contents in the form of a plurality of packets from the server, the client performs a transmission characteristic measurement algorithm of the server to measure a transmission characteristic value. The client includes an instruction for storing the measured transmission characteristic value in the database.

When the transmission characteristic value of the server does not exist in the database, an instruction according to another embodiment of the present invention includes an instruction for requesting the server to transmit multimedia contents according to a default value. The multimedia contents are received in the form of a plurality of packets from the server. The transmission characteristic measurement algorithm of the server is measured to determine the transmission characteristic value while receiving the multimedia contents in the form of a plurality of packets from the server. The measured transmission characteristic value is stored in the database. A current connection to the multimedia contents is cut off. The server is requested to transmit the multimedia contents again using the measured transmission characteristic value.

The instruction measures a real-time bit rate n of a packet received from the server according to an HTTP GET request. When packet reception is not swift, a measurement value defined in advance is used. When the packet reception is swift, it is determined whether m<n (that is, determine whether a previous bit rate m is greater than a currently measured bit rate n). When the previous bit rate m is greater than the currently measured bit rate n, a measurement value defined in advance is determined as a transmission characteristic value. When the previous bit rate m is less than or equal to the currently measured bit rate n, the previous bit rate m is set to the currently measured bit rate n. When the measurement value m changes continuously, a real-time network bit rate is measured continuously. When the measurement value m does not change continuously, it is determined that the server maintains a slow transmission speed appearing after a section of initially sending data fast.

Various functions of the electronic device 700 described above or to be described below, according to embodiments of the present invention, may be executed by hardware and/or software and/or a combination of these including one or more stream processings and/or Application Specific Integrated Circuit (ASIC).

Figure 8:
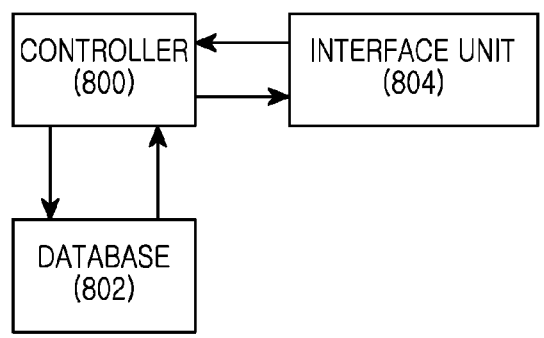
FIG. 8 is a block diagram illustrating a server apparatus, according to an embodiment of the present invention.

FIG. 8 is a block diagram illustrating a server apparatus, according to an embodiment of the present invention.

Referring to FIG. 8, the server apparatus includes a controller 800, a database 802, and an interface unit 804.

The controller 800 controls an overall operation of the server, and transmits contents stored in the database 802 to a client via the interface unit 804, in response to a multimedia contents request of the client. The controller 800 provides streaming of multimedia contents to the client depending on a transmission characteristic.

The database 802 stores a plurality of multimedia contents and provides multimedia contents to the controller 800 when needed.

The interface unit 804 serves as an interface for connecting the server with the client, and supports network socket communication.

Though a description of embodiments of the present invention has been made on multimedia contents reception based on a streaming method, additional embodiments of the present invention are also applicable to multimedia contents reception based on a download method.

Methods according to embodiments of the present invention may be implemented in the form of software, hardware, or a combination of these.

In case of implementation in the form of software, a computer readable storage medium storing one or more programs (software modules) may be provided. The one or more programs stored in the computer readable storage medium are configured for execution by one or more processors inside the electronic device. The one or more programs include instructions for allowing the electronic device to execute methods according to the embodiments described in claims and/or specification of the present invention.

These programs (software modules, software) may be stored in a random access memory, a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs) or other types of optical storage devices, and a magnetic cassette. Alternatively, these programs may be stored in a memory configured in a combination of some or all of these. Also, a plurality of respective memories may be provided.

These programs may be stored in an attachable storage device that can access the electronic device via a communication network such as the Internet, Intranet, Local Area Network (LAN), Wide LAN (WLAN), and a Storage Area Network (SAN), or a communication network configured in combination of these. This storage device may access the electronic device via an external port.

A separate storage device on a communication network may access a portable electronic device.

As described above, embodiments of the present invention are advantageous in that they improve a multimedia streaming performance in consideration of a transmission characteristic value of a server when performing multimedia streaming. Also, a client may reproduce data at a faster speed when receiving various multimedia streaming services, so that frequent buffering may be reduced. A greater effect is obtained when high image quality data are streamed, and a performance may be discriminated in a mobile apparatus such as a recent tablet PC. Since a client cuts off a network connection after receiving data fast, a power consumption reduction performance may be maximized.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method in an electronic device, the method comprising the steps of:
    transmitting a first request signal for a first stream data for a first request data section to a server;
    receiving first stream data from the server;
    transmitting a second request signal for a second stream data for a second request data section to the server,
    wherein the first request signal instructing the server to transmit data more than the second request signal is based on a determination by the electronic device,
    wherein the determination is according to a transmission characteristic of an initial portion of the transmission in that the server transmits data faster during the initial portion than another portion in a transmission pattern of the server.

2. The method of claim 1, wherein the first request data signal and the second request data signal include:
    at least one of a size of request data section, a number of network socket connections, and a time point of network socket connections.

3. The method of claim 2, wherein the number of network socket connections is determined based on a buffer size for reproducing streaming.

4. The method of claim 2, wherein the time point of network socket connections is before the request data section ends.

5. The method of claim 2, wherein the request data section is determined on an I frame basis or a Group Of Pictures (GOP) basis.

6. The method of claim 1, further comprising:
    calculating a network bit rate, when receiving at least one of the first stream data and the second stream data from the server;
    comparing the network bit rate with a previous network bit rate to determine whether a bit rate changes continuously;

determining a section, from among a plurality of sections, where a transmission speed of an initial portion is high and during which the server transmits data, based on a time point where the bit rate does not change continuously; and updating a transmission characteristic value using the section where the transmission speed of the initial portion is high.

7. The method of claim 6, further comprising:

cutting off a current network socket connection, after determining the section where the transmission speed of the initial portion is high; and re-requesting the first stream data in consideration of the transmission characteristic.

8. The method of claim 1, wherein receiving the requested first stream data from the server is performed based on a streaming method that uses a Hyper Text Transfer Protocol (HTTP) or a download method.

9. An electronic device comprising:

a memory;

one or more processors; and one or more modules stored in the memory and configured to be executable by the one or more processors, wherein the one or more modules comprise instructions for transmitting a first request signal for a first stream data for a first request data section to a server;

receiving first stream data from the server;

transmitting a second request signal for a second stream data for a second request data section to the server, wherein the first request signal instructing the server to transmit data more than the second request signal is based on a determination by the electronic device, wherein the determination is according to a transmission characteristic of an initial portion of the transmission in that the server transmits data faster during the initial portion than another portion in a transmission pattern of the server.

10. The device of claim 9, wherein the first request data signal and the second request data signal include at least one of a size of request data section, a number of network socket connections, and a time point of network socket connections.

11. The device of claim 10, wherein the number of network socket connections is determined based on a buffer size for reproducing streaming.

12. The device of claim 10, wherein the time point of network socket connections is before the request data section ends.

13. The device of claim 10, wherein the request data section is determined on an I frame basis or a Group Of Pictures (GOP) basis.

14. The device of claim 9, wherein the module further comprises instructions for calculating a network bit rate, when receiving at least one of the first stream data and the second stream data from the server;

comparing the network bit rate with a previous network bit rate to determine whether a bit rate changes continuously;

determining a section, from among a plurality of sections, where a transmission speed of an initial portion is high and during which the server transmits data based on a time point where the bit rate does not change continuously; and updating a transmission characteristic value using the section where the transmission speed of the initial portion is high.

15. The device of claim 14, wherein the module further comprises instructions for cutting off a current network socket connection after determining the section where the transmission speed of the initial portion is high, and re-requesting the first stream data in consideration of the transmission characteristic.

16. The device of claim 9, wherein receiving the requested first stream data is performed based on a streaming method that uses a Hyper Text Transfer Protocol (HTTP) or a download method.

* * * * *